United States Patent [19]

Barkwith

[11] 4,138,595
[45] Feb. 6, 1979

[54] IDLE-BUSY SIGNALLING BETWEEN TELEPHONE SYSTEM AND RADIOPHONE SYSTEM

[75] Inventor: John R. Barkwith, Hauppauge, N.Y.

[73] Assignee: RCA Corporation, New York, N.Y.

[21] Appl. No.: 830,856

[22] Filed: Sep. 6, 1977

[30] Foreign Application Priority Data

Aug. 23, 1977 [CA] Canada .................................. 285341

[51] Int. Cl.$^2$ ........................ H04M 7/00; H04M 3/22; H04B 1/38
[52] U.S. Cl. ........................................ 179/2 E; 325/5; 343/177
[58] Field of Search ................ 179/2 E, 2 EA; 325/2, 325/3, 5, 8, 15, 51, 55, 133, 364; 343/175, 177

[56] References Cited

U.S. PATENT DOCUMENTS

| | | | |
|---|---|---|---|
| 2,773,977 | 12/1956 | Hale | 325/364 |
| 3,105,881 | 10/1963 | Maurushat | 179/27 G |
| 3,946,315 | 3/1976 | Tustison | 325/55 |

Primary Examiner—William C. Cooper
Assistant Examiner—Kenneth A. Chayt
Attorney, Agent, or Firm—H. Christoffersen; Samuel Cohen; Carl V. Olson

[57] ABSTRACT

An interface unit for use between a telephone system in which a single-frequency tone is transmitted in both directions when the circuit is on-hook (idle) and a single-channel-per-carrier radio system in which the radio frequency carrier is not transmitted when the circuit is idle. A transmitting portion includes a single-frequency tone detector means responsive to termination or initiation of the tone from the telephone system to turn on the radio frequency carrier. A receiving portion includes a radio frequency carrier detector means operative to switch the telephone system from the output of a local single frequency local oscillator to a voice frequency line from the radio system, and a single frequency detection means to switch the telephone system back to the output of the local single frequency oscillator.

8 Claims, 3 Drawing Figures

IDLE-BUSY SIGNALLING BETWEEN TELEPHONE SYSTEM AND RADIOPHONE SYSTEM

This invention relates to radio frequency communication systems and more specifically to radio frequency communications systems which are compatible with land based telephone systems.

For radio frequency communications links to be compatible with land based telephone systems, it is necessary that the system be capable of transmitting and receiving not only the voice signals but also the ringing, dialing, and idle circuit signals. The ringing, dialing, and idle circuit signals are all voice frequency signals. Such a communication system is continuously on so as to transmit the voice, ringing, and dialing signals and in particular, the continuous idle circuit signal. One disadvantage of such a system is apparent in applications in which power is at a premium. If power is at a premium, the continuous operation of the radio communications system is undesirable. Such applications are when either termination of the system is in a remote location or both terminations are in remote locations, the radio frequency repeater is in a satellite at a remote earth orbit location, or all three are in remote locations.

In normal telephone trunk circuits in North America, a Single-Frequency (SF) signal tone (frequency 2600 Hz) is transmitted continuously in both directions while the circuit is on-hook (idle). The off-hook (busy) condition of the circuit is indicated by the loss of this tone and the addressing (dial pulsing) is carried by pulses of SF tone.

For Single Channel per Carrier (SCPC) systems it is desirable that the radio frequency (RF) carrier not be transmitted while the circuit is in the idle state. Clearly, if this is to be the case, the telephone circuit signalling system must be modified in the SCPC path, since the SF tone cannot be transmitted if the RF carrier is not present to carry it.

The use of SCPC systems is a relatively recent development and therefore the problem is fairly new. One operational solution to this problem uses a code to indicate on-hook, and another code to indicate off-hook, to the far end. The codes are transmitted by pulsing the RF carrier. Upon receipt of the on-hook signal, the receiver substitutes a locally generated SF tone for the one transmitted from the other end, thereby eliminating the need for the carrier to be present continuously during the idle state.

According to an example of the invention, at the transmitting end, a single frequency tone detection means turns on the radio frequency carrier in response to cessation or initiation of a single frequency tone from the telephone system. At the receiving end, a radio frequency detection means connects the telephone system to the radio system when a radio frequency carrier is detected. A single frequency tone detection means connects the telephone system to receive a locally-generated single frequency tone.

Figure 1:
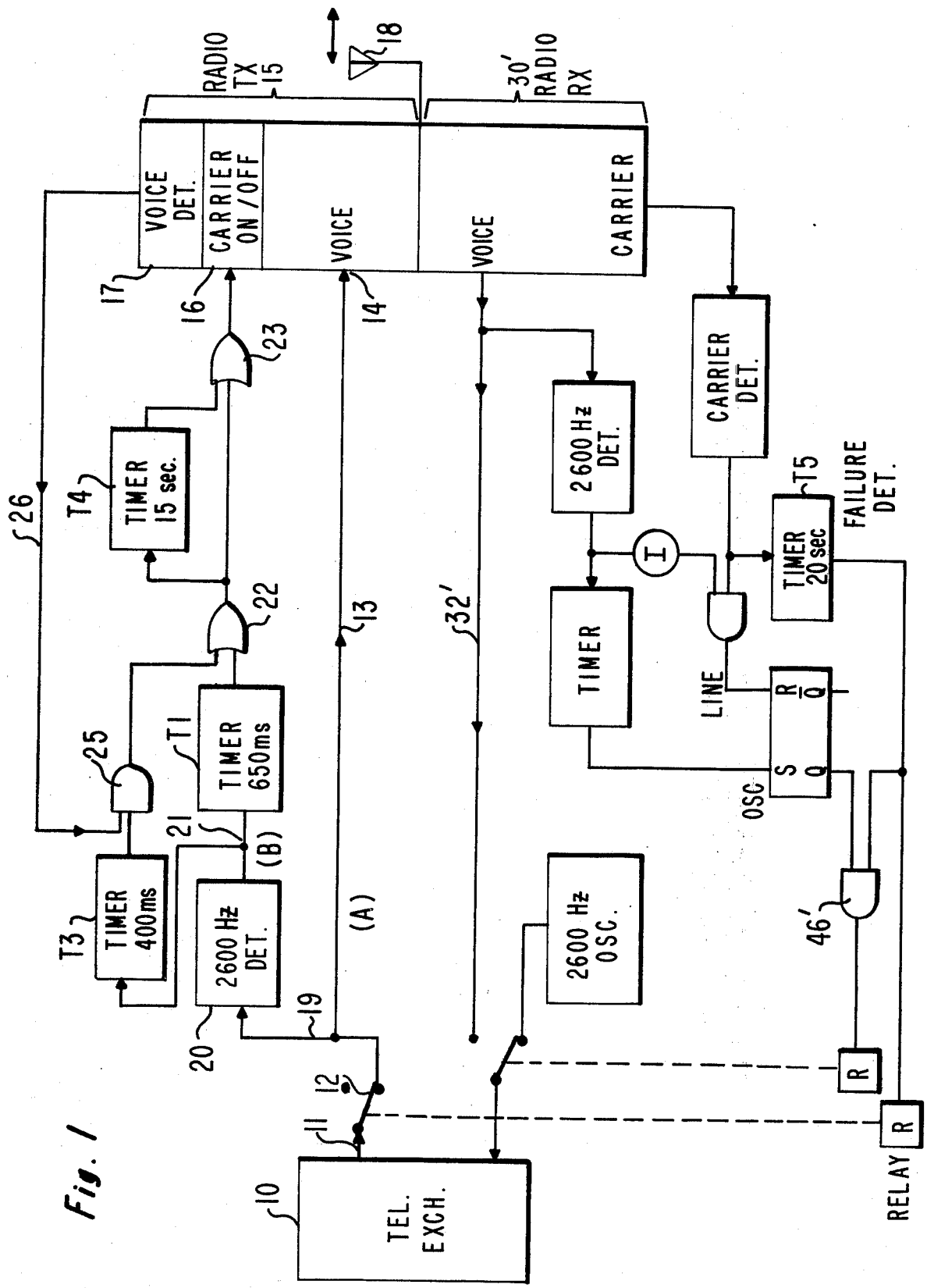
FIG. 1 is a block diagram of a full duplex land telephone and radio telephone terminal.

Referring now in greater detail to the drawing, FIG. 1 shows a telephone exchange 10 having an outgoing conductor 11 of a telephone line connected through a switch 12 and a voice frequency line 13 to the voice input 14 of a radio transmitter 15. The radio transmitter includes a carrier on/off switch 16, a voice detector 17 and an antenna 18 for transmitting a radio frequency carrier to a distant terminal.

The units shown between the telephone exchange 10 and the radio transmitter 15 constitute the transmitting portion of an interface unit which includes a 2600 Hz detector 20 responsive over line 19 to a single-frequency (SF) tone on voice frequency line 13. The output of the detector 20 is applied to a first timer T1 from which an output is applied through "or" gates 22 and 23 to the carrier on/off switch 16 in the radio transmitter 15. The interface unit also includes a third timer T3 having an input from the output 21 of the detector 20, and having an output through an "and" gate 25 to an input of "or" gate 22. The "and" gate 25 receives a second input over line 26 from the voice detector 17 in the radio transmitter 15. A fourth timer T4 has an input connected from the output of "or" gate 22, and an output connected to an input of the "or" gate 23.

Figure 2:
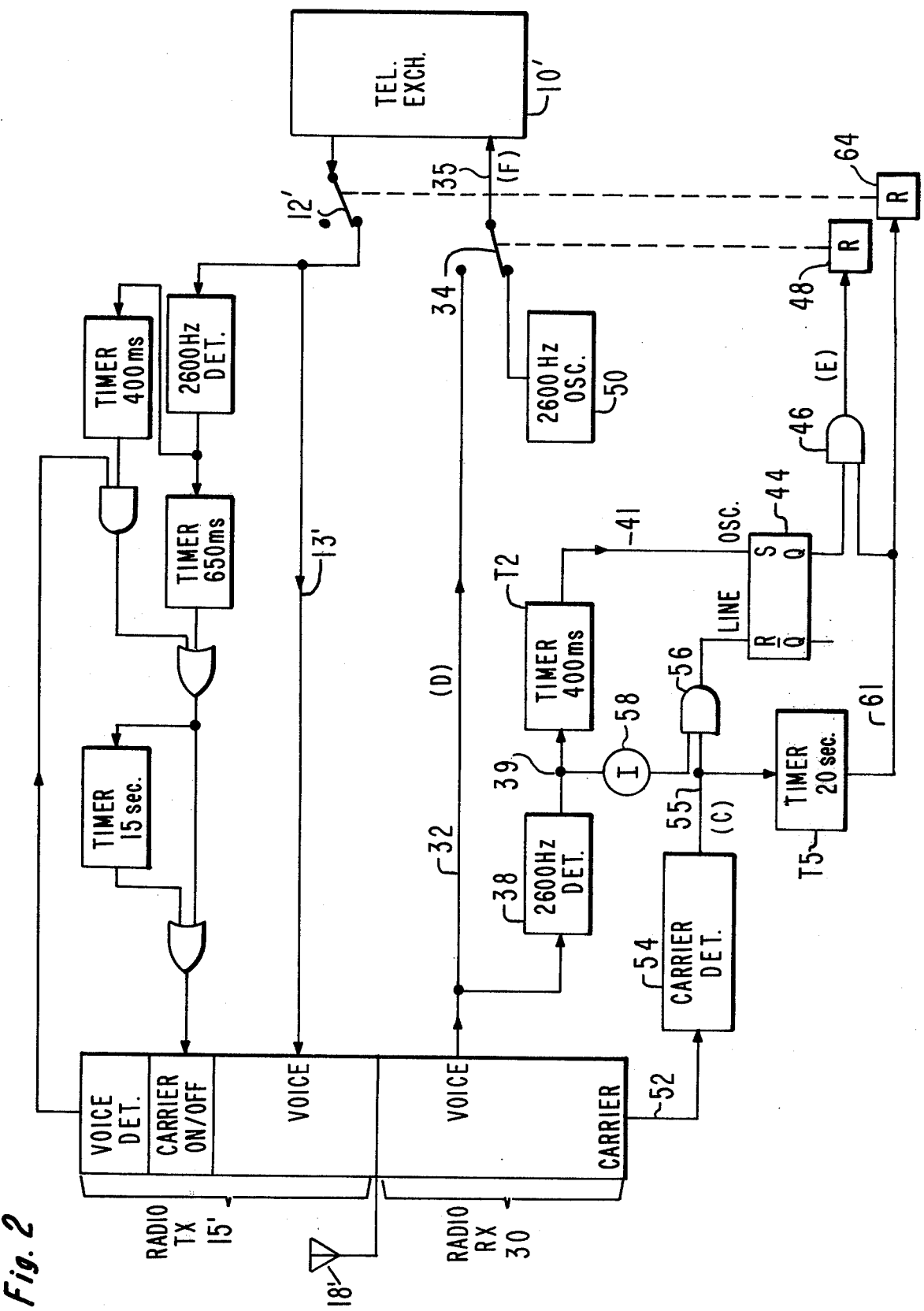
FIG. 2 is a block diagram of an identical remote terminal, the block diagram being a mirror image of the diagram of FIG. 1.

FIG. 2 shows a remote terminal which is exactly the same as the local terminal shown in FIG. 1. The upper half of FIG. 2 is the mirror image of the upper half of FIG. 1, which has already been described. The receiving portion shown in the bottom half of FIG. 2 will now be described, and the description will apply as well to the identical elements shown in the bottom half of FIG. 1. A radio frequency signal transmitted from the antenna 18 in FIG. 1 is received by the antenna 18' in FIG. 2 and the information conveyed by the radio frequency signal is applied through a radio receiver 30, a receiving voice frequency line 32, and a switch 34 to the receiving input 35 of a telephone exchange 10'.

In FIG. 2, a 2600 Hz detector 38 has its input connected to the voice frequency line 32, and has its output 39 connected to the input of a second timer T2 having an output 41 connected to the set input S of a flip flop 44. The "Q" output of flip flop 44 is connected through an "and" gate 46 to a relay which controls the position of switch 34 to connect either a 2600 Hz oscillator 50 to the telephone exchange 10', or to connect the voice frequency input line 32 to the telephone exchange 10'.

The radio receiver 30 has a radio frequency carrier signal output 52 which is applied to a carrier detector 54. Detector 54 has an output at 55 connected through an "and" gate 56 to the reset input R of the flip flop 44. The "and" gate 56 also has an input through an inverter 58 from the output 39 of the 2600 Hz SF detector 38.

A fifth timer T5 has an input connected from the output 55 of carrier detector 54, and has an output over line 61 to an input of the "and" gate 46, and to a second relay 64 which is mechanically connected to operate a switch 12'.

The operation of the transmitting portion of the interface unit in the upper half of FIG. 1, and the operation of the receiving portion of the interface unit in the bottom half of FIG. 2, will now be described with references to the voltage waveforms shown in FIG. 3. During an initial on-hook condition of the output line 11 from telephone exchange 10, the telephone exchange supplies a 2600 Hz single frequency (SF) signal 70 through switch 12 to the outgoing frequency line 13, as shown in waveform A in FIG. 3. The SF signal 70 is detected by detector 20 producing a level 71 which switches to a low level 72 at the termination of the SF signal 70 on the occurrence of an off-hook condition at time 73. The output waveform B from the detector 20 is applied to the first timer T1, which is characterized in providing a high output for 650 milliseconds following a leading edge, or a trailing edge, transition in the waveform B, as shown by the pulse 74 in the waveform C. The positive level 74 from the timer T1 is applied through the "or" gates 22 and 23 to the carrier on/off switch in the radio transmitter 15 to cause the transmitter carrier to be transmitted from antenna 18 to antenna 18' at the distant terminal.

Figure 3:
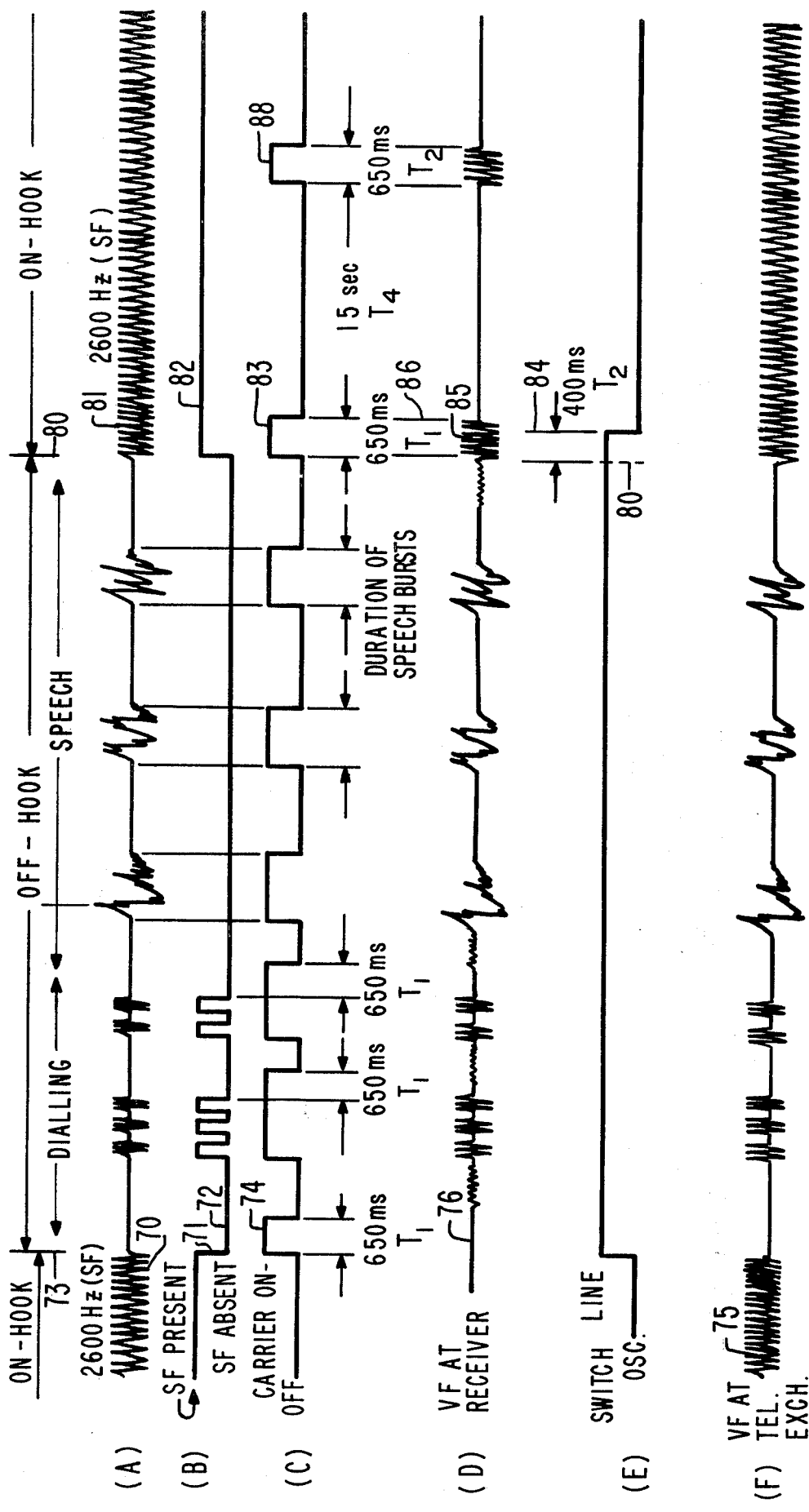
FIG. 3 is a chart of voltage waveforms which will be referred to in describing the operation of the system of FIGS. 1 and 2.

The transmitted radio frequency carrier received by radio receiver 30 in FIG. 2 is detected by the carrier-presence detector 54, which produces an output at 55 which is the same as the waveform C in FIG. 3. The output 74 of waveform C from detector 54 is applied through an "and" gate 56 to the reset input R of the flip flop 44. This changes the state of the flip flop and causes the "Q" output to go low. This causes the output of "and" gate 46 to go low so that the relay 48 de-energizes and the switch 34 connects line 32 to the input 35 of the telephone exchange 10'. The switch 34 was previously connected as shown in the drawing to supply the 2600 Hz SF signal from the oscillator 50 to the voice frequency input 35 of the telephone exchange 10', as shown by the oscillations at 75 of the waveform F in FIG. 3. Now that the flip flop 44 has been reset, the relay 48 causes switch 34 to move to the position in which the incoming voice frequency line 32 is connected through the switch 34 to the telephone exchange 10'. The waveform E represents the state of the flip flop 44 and the position of the switch 34.

After the voice frequency line 32 is connected by switch 34 to the input of the telephone exchange 10', there is no voice frequency signal modulated on the received radio frequency carrier, as indicated by the zero amplitude 76 of waveform D, because none is at this time supplied from the remote telephone exchange 10. The absence of a 2600 Hz SF signal on line 32 is detected by the 2600 Hz detector 38, and its output is inverted by inverter 58 and thereby caused to enable "and" gate 56 to permit the already-described resetting of flip flop 44 and the already-described connection by switch 34 of the voice frequency line 32 to the input of the telephone exchange 10'.

During the off-hook condition of the system, the dialing and other voice frequency signals from the telephone exchange 10 in FIG. 1 are modulated on the radio frequency carrier and conveyed from the radio receiver 30 and over the voice frequency line 32 to the telephone exchange 10'. When speech bursts occur, the voice detector 17 in the radio transmitter 15 in FIG. 1 causes a signal over line 26 and through gates 25, 22 and 23 to turn the radio frequency carrier on for the duration for the speech bursts. The third timer T3 is characterized by having an output which is high until 400 ms after continuous application of a high at the input, at which time it goes low. The third timer T3 therefore inhibits gate 25 after a time period of 400 milliseconds following detection of an SF signal on line 13 by the detector 20 and for the duration of continuous SF signal thereafter. This prevents the voice detector 17 from responding to a 2600 Hz SF signal and continuously maintaining the radio frequency turned on after the 400 millisecond period determined by timer T3.

During the off-hook condition that has been described, speech signals are transmitted from the telephone exchange 10 in FIG. 1 to the telephone exchange 10' in FIG. 2 until such time, designated 80 in FIG. 3, that the telephone exchange 10 signals the end of the telephone communication by transmitting an on-hook SF signal represented at 81. The initiation of the SF signal is detected in FIG. 1 by the detector 20 which starts the timer T1, which in turn turns on the radio frequency carrier for the 650 millisecond period 83, FIG. 3C. The 2600 Hz SF tone from the telephone exchange 10 is modulated on the carrier of radio transmitter 15 and is transmitted to the radio receiver 30 in FIG. 2. The presence of this radio frequency carrier is detected by carrier detector 54 and its output would act through gate 56 to reset the flip flop 44 were it not for the fact that the simultaneous presence of the SF tone 85 of FIG. 3D, on the voice frequency line 32 is detected by detector 38 and the output thereof after inversion in inverter 58 inhibits the "and" gate 56. However, the output of SF detector 38 is also applied to the second timer T2, and after a time period of 400 milliseconds, the output of timer T2 is applied to the set input S of flip flop 44, and this causes the output of the flip flop to operate the relay 48 and cause the switch 34 to return to the position shown in which the 2600 Hz oscillator 50 is connected to the voice frequency input of the telephone exchange 10'.

It is noted that during the 400 millisecond interval from time 80 to time 84 in FIG. 3, the telephone exchange 10' receives the SF tone over line 32 as modulation on a radio frequency carrier received from the transmitting telephone exchange 10 in FIG. 1, and that at time 84 switch 34 disconnects telephone exchange 10' from the voice frequency line 32 and a tone from the oscillator 50 is applied to the telephone exchange 10'. In this way, after the 400 millisecond delay, the telephone exchange 10' receives a locally-generated 2600 Hz SF signal the same as the one transmitted by the telephone exchange 10 in FIG. 1, even though the radio frequency carrier operating between FIGS. 1 and 2 is turned off 150 milliseconds later after the 650 millisecond delay determined by the timer T1 in FIG. 1. It can be seen from FIG. 3 that the voice frequency signal F received by telephone exchange 10' during the described on-hook, off-hook and on-hook conditions is the same as the voice frequency signal A transmitted by the telephone exchange 10.

The timer T4 in FIG. 1 and the timer T5 in FIG. 2 are provided for the purpose of signalling when a failure has occurred in the operation of the radio transmitter or receiver. The timer T4 is characterized by having an output which goes high for 650 milliseconds after the input has remained low for an uninterrupted period such as 15 seconds. This means that the radio frequency carrier is always turned on for 650 milliseconds 15 seconds after the last time that the carrier was turned on as shown at 88 in FIG. 3C. Whenever the radio frequency carrier in FIG. 1 is thus automatically turned on, the presence of the carrier is detected in FIG. 2 by the carrier detector 54, and the output thereof at 55 is applied to the fifth timer T5. The timer T5 output is normally high. The output goes low only if it fails to receive any input for a period, for example, of 20 seconds. If the carrier bursts occurring every 15 seconds are not received, the timer T5, after 20 seconds, supplies a low signal over line 61 to the relay 64 which de-energizes to open the switch 12' connecting the telephone exchange 10' to the voice frequency line 13'.

The output from timer T5 is also applied to "and" gate 46. When the output from timer T5 goes low, "and" gate 46 is inhibited causing relay 48 to de-energize and the switch 34 to disconnect the oscillator 50 and connect the voice frequency line 32 to the telephone exchange 10'. Under these conditions, the circuit appears to the telephone exchanges to be busy, and unreasonably long continuation of this condition is then recognized as a failure in the radio system. Without such a provision, a failure in the radio system could go undetected indefinitely.

It will be understood that the description of operation in the transmission of a signal from a telephone exchange 10 in FIG. 1 to the telephone exchange 10' in FIG. 2 is exactly the same as the transmission in the opposite direction using the transmitting portion of the interface unit in the upper half of FIG. 2 and the receiving portion of the interface unit in the bottom half of FIG. 1. It will also be understood that while specific time periods have been referred to by way of illustration, various other time periods may be employed provided that the relative relationships are maintained.

What is claimed is:

1. An interface unit for use between a telephone system in which a single-frequency (SF) tone is transmitted in both directions when the circuit is on-hook (idle) and a single-channel-per-carrier radio system in which the radio frequency (RF) carrier is not transmitted when the circuit is idle, comprising
   a transmitting portion including:
   a first voice frequency line from said telephone system to said radio system,
   SF tone detection means coupled to said first voice frequency line and operative in response to cessation or initiation of an SF tone thereon to apply a signal to the radio system turning on the RF carrier; and
   a receiving portion including:
   an SF tone oscillator,
   a second voice frequency line connected to said radio system,
   RF carrier detection means operative upon receipt of an RF carrier by said radio system to connect said telephone system to said second voice frequency line, and
   SF tone detection means responsive to an SF tone on said line to connect said telephone system to the output of said SF oscillator.

2. An interface unit according to claim 1 wherein said transmitting portion SF tone detection means includes a first timer constructed so that the RF carrier is turned on for a first predetermined time period.

3. An interface unit according to claim 2 wherein said receiving portion SF tone detection means includes a second timer constructed so that said SF tone detection means operates after a second predetermined time delay longer than said first time period to connect said telephone system to the output of said SF oscillator.

4. An interface unit according to claim 3 wherein said receiving portion includes gate means receptive to the output of said SF tone detection means to prevent the RF carrier detection means from connecting the telephone system to the second voice frequency line when an SF tone is present on the line.

5. An interface unit according to claim 2 wherein said transmitting portion includes a third timing means responsive to the output of said SF tone detection means and operative to inhibit the voice detector in the radio system from keeping the RF carrier turned on, due to the presence of an SF tone on the first voice frequency line, beyond a predetermined time period.

6. An interface unit according to claim 5 wherein said transmitting portion includes a fourth timing means operative after the RF carrier is off for a predetermined long period of time to turn the RF carrier on for a predetermined relatively-short period of time.

7. An interface unit according to claim 6 wherein said receiving portion includes a fifth timing means responsive to the absence of an output of said RF carrier detection means for a period somewhat longer than said predetermined long period of time to disconnect the telephone system from the voice frequency line, whereby to make the circuit appear to be busy and to thereby signal a failure of the radio system.

8. An interface unit for use between a telephone system in which a single-frequency (SF) tone is transmitted in both directions when the circuit is on-hook (idle) and a single-channel-per-carrier radio communication system in which the radio frequency (RF) carrier is not transmitted when the circuit is idle, comprising
   a transmitting portion including:
   a first voice frequency line from said telephone system to said radio system,
   a first SF tone detector for detecting off-hook and dialing signals on said first voice frequency line, and
   first timer means responsive to the output of said tone detector to turn on the RF carrier of said radio system for a predetermined time period following each transition in the output of said SF tone detector; and
   a receiving portion including:
   a second voice frequency line from said radio system connectable through a two-position switch to said telephone system,
   a SF tone oscillator alternately connectable through said switch to said telephone system,
   an RF carrier detector responsive to an RF carrier signal on said second voice frequency line to connect said line through said switch to said telephone system, and
   a second SF tone detector responsive to an SF tone on said second voice frequency line, and
   second timer means responsive to the output of said second SF tone detector to connect said SF tone oscillator through said switch to said telephone system.

* * * * *

UNITED STATES PATENT AND TRADEMARK OFFICE
CERTIFICATE OF CORRECTION

PATENT NO. : 4,138,595

DATED : February 6, 1979

INVENTOR(S) : John Raymond Barkwith

It is certified that error appears in the above-identified patent and that said Letters Patent is hereby corrected as shown below:

Title Page, change "[73] Assignee: RCA Corporation, New York, N.Y.", to --[73] Assignee: RCA Limited, Quebec, Canada.

Signed and Sealed this

Twenty-seventh Day of November 1979

[SEAL]

Attest:

RUTH C. MASON
*Attesting Officer*

LUTRELLE F. PARKER
*Acting Commissioner of Patents and Trademarks*